INVENTOR.
A. W. NOLLE
BY G. D. O'Brien
R. M. Hicks
ATTYS.

Aug. 22, 1961 A. W. NOLLE 2,997,668

METHOD AND APPARATUS FOR CONTROLLING THE RELATIVE GAINS OF A PLURALITY OF AMPLIFIERS

Filed Jan. 29, 1952 2 Sheets-Sheet 2

INVENTOR.
A. W. NOLLE

BY G. D. O'Brien
R. M. Hicks
ATTYS.

United States Patent Office 2,997,668
Patented Aug. 22, 1961

2,997,668

METHOD AND APPARATUS FOR CONTROLLING THE RELATIVE GAINS OF A PLURALITY OF AMPLIFIERS

Alfred W. Nolle, Austin, Tex., assignor to the United States of America as represented by the Secretary of the Navy Filed Jan. 29, 1952, Ser. No. 268,836
5 Claims. (Cl. 333—2)

This invention relates to electronic amplifiers for the amplification of alternating voltages, and more particularly pertains to a method and system for maintaining equal gains in a plurality of amplifiers.

An important object of this invention is to provide a plurality of amplifier channels, the gains of which depend upon the output voltages of the several amplifier channels in such a manner that the average combined voltage outputs of all of the amplifier channels remains substantially constant.

A further object of this invention is to provide a gain control system for a plurality of amplifier channels which will simultaneously effectuate equal changes in the gain of all of the channels, and which will reduce any initial gain unbalance between amplifier channels.

Another object of this invention is to provide a system for maintaining the gains of the plurality of amplifier channels equal through the introduction of a locally generated signal into the inputs of the several amplifier channels.

Yet another object of this invention is to provide a system for maintaining the gains of a plurality of amplifier channels equal through the introduction of a locally generated signal into the inputs of the several amplifier channels, and for maintaining the combined voltage outputs of the several amplifier channels substantially constant through the control of the amplitude of the locally generated signal, in accordance with the amplitude of the combined voltage output of the amplifier channels.

Figure 1:
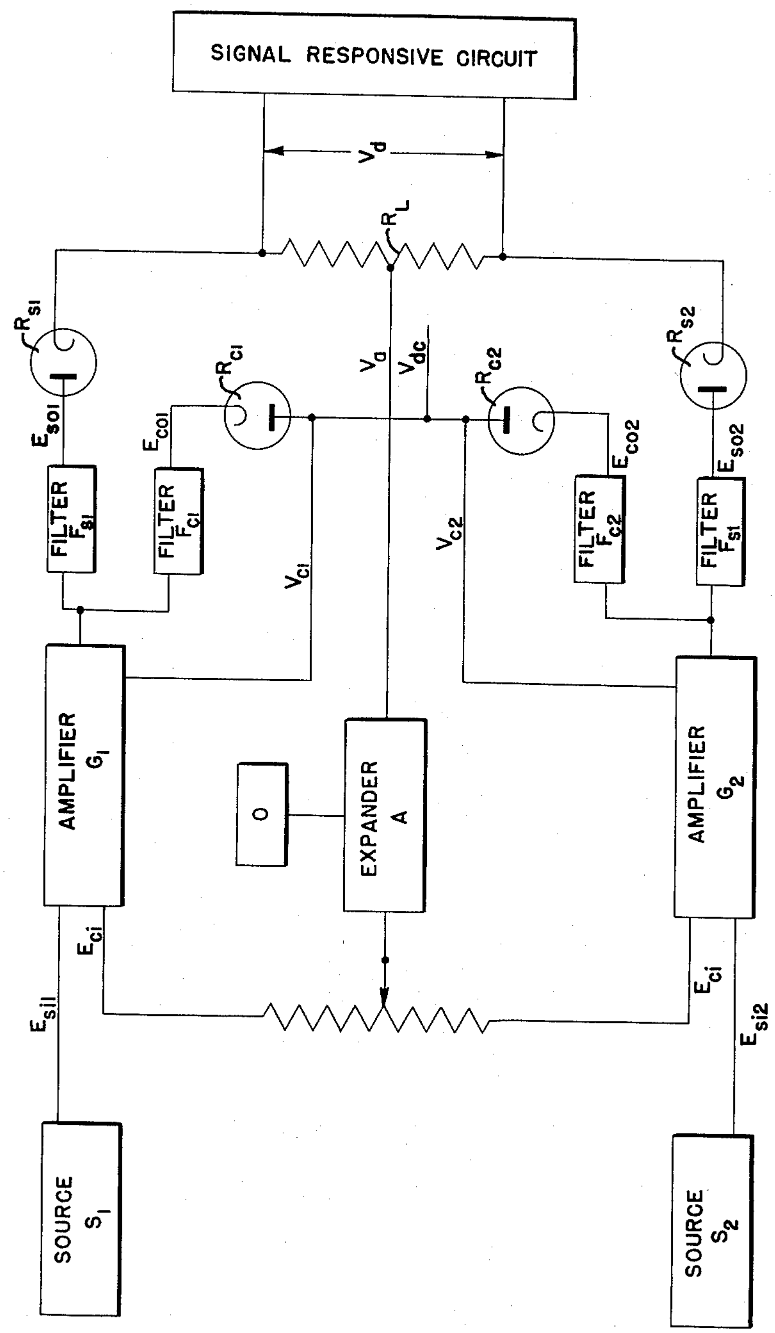
Figure 2:
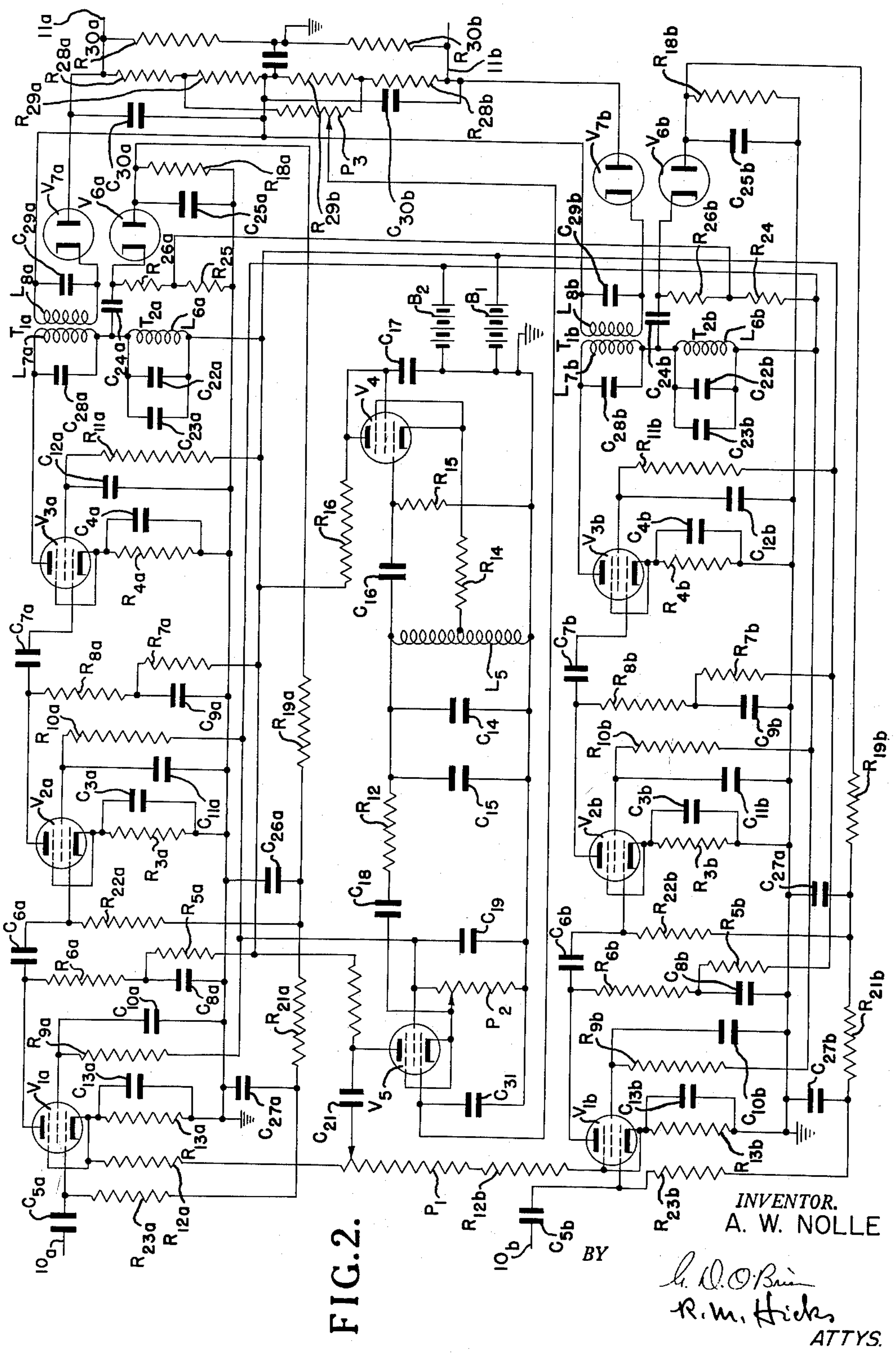

These, together with various ancillary objects and features are attained by this device, a preferred embodiment of which is illustrated in the accompanying drawings wherein:

FIG. 1 is a block diagram of a pair of amplifier channels and associated circuits which control the gain of the amplifiers; and FIG. 2 is a schematic diagram of a multi-channel amplifier and the associated circuits for controlling the gains of the several amplifier channels.

Reference is now made more specifically to the block diagram in FIG. 1 of the drawings wherein $G_1$ and $G_2$ are two amplifier channels having gains $G_1$ and $G_2$, respectively, expressed in decibels. Signal voltages from sources $S_1$ and $S_2$, having respective amplitudes $E_{si1}$, and $E_{si2}$, which, for convenience are expressed in decibels referred to one volt, and of a frequency called signal frequency, are respectively applied to the inputs of the amplifier channels $G_1$ and $G_2$, and signal output voltages $E_{so1}$ and $E_{so2}$, measured in decibels referred to one volt, appear at the respective output terminals of band-pass filter $F_{s1}$ and $F_{s2}$ which are coupled to the amplifier channels.

A locally generated signal, hereinafter referred to as the pilot signal, of a frequency called the pilot frequency which is different from the signal frequency, and of amplitude $E_{ci}$, measured in decibels referred to one volt, is applied to the input of each of the amplifier channels, $G_1$ and $G_2$. The amplifiers $G_1$ and $G_2$ are chosen so as to have uniform amplification over a band of frequencies including both the pilot frequency and the signal frequency and thus serve to amplify both the pilot signal $E_{ci}$ and the input signal voltages $E_{si1}$ and $E_{si2}$ applied thereto, whereby pilot output voltages $E_{co1}$ and $E_{co2}$, measured in decibels referred to one volt, appear at the output of band-pass filters $F_{c1}$ and $F_{c2}$ which are respectively coupled to the outputs of amplifier channels $G_1$ and $G_2$. The pilot signal $E_{ci}$, applied to the input of each amplifier channel is related to the amplified replicas $E_{co1}$ and $E_{co2}$ appearing at the output of the amplifier channels $G_1$ and $G_2$ respectively, as given by the following expressions:

$$(1) \qquad E_{co1}=E_{ci}+G_1$$

$$(2) \qquad E_{co2}=E_{ci}+G_2$$

where $G_1$ and $G_2$ is the gain of the amplifier channels $G_1$ and $G_2$, respectively.

The voltages $E_{so1}$ and $E_{co1}$, and the voltages $E_{so2}$ and $E_{co2}$ are separated at the output of the amplifier channels by the frequency selective filters $F_{s1}$, $F_{c1}$ and $F_{s2}$, and $F_{c2}$ respectively, and the voltages $E_{co1}$ and $E_{co2}$ respectively applied to the biased rectifiers $R_{c1}$ and $R_{c2}$, which are respectively individual to amplifiers $G_1$ and $G_2$. The resultant voltages $V_{c1}$ and $V_{c2}$, produced by the rectifiers are respectively applied to the amplifiers $G_1$ and $G_2$, as gain control voltages, the gain control voltages being related to the applied output voltages as follows:

$$(3) \qquad V_{c1}=L_1E_{co1}$$

$$(4) \qquad V_{c2}=L_2E_{co2}$$

where $L_1$ and $L_2$ are the output of the rectifiers $R_{c1}$ and $R_{c2}$, respectively, measured in volts per decibel input referred to one volt, and which depend on the characteristics of the rectifiers. The bias voltage $V_{dc}$, which is applied to each rectifier to provide delayed AVC is preferably measured in volts, and is the same value for each rectifier.

For each of the amplifiers, the gain is constant when the gain control voltages $V_{c1}$ and $V_{c2}$ are zero, under which conditions the gain of each of the amplifier channels $G_1$ and $G_2$ is a value $G_{o1}$ and $G_{o2}$, respectively, and the operating conditions of the amplifier are then said to lie below the AVC point. When the gain control voltages $V_{c1}$ and $V_{c2}$ are greater than zero, the gain of each amplifier depends upon the magnitude of the gain control voltage $V_c$, as given by the following expressions and the equivalent forms thereof:

$$(5) \qquad G_1=G_{o1}-K_1V_{c1}=G_{o1}-K_1L_1E_{co1}=\frac{G_{o1}-K_1L_1E_{ci}}{1+K_1L_1}$$

$$(6) \qquad G_2=G_{o2}-K_2V_{c2}=G_{o2}-K_2L_2E_{co2}=\frac{G_{o2}-K_2L_2E_{ci}}{1+K_2L_2}$$

where $K_1$ and $K_2$ are gain factors associated with amplifier channels $G_1$ and $G_2$, respectively, and are determined by the response of the amplifier channels to the gain control voltage applied thereto, and are measured in decibels per volt of gain control voltage.

From Equations 1–6 it will be seen that the pilot output voltage is related to the pilot input signal and the gain of the amplifier channels, as follows:

$$(7) \qquad E_{co1}=\frac{E_{ci}+G_{o1}}{1+K_1L_1}$$

$$(8) \qquad E_{co2}=\frac{E_{ci}+G_{o2}}{1+K_2L_2}$$

It is desirable to define a flatness factor $F_c$ of the amplifier as the change in input pilot voltage, $E_{cia}-E_{cib}$, divided by the resultant change in the output pilot voltage, $E_{coa}-E_{cob}$. The flatness factor is then given by:

(9)
$$F_c=\frac{E_{cia}-E_{cib}}{E_{coa}-E_{cob}}=\frac{E_{cia}-E_{cib}}{\frac{E_{cia}+G_o-E_{cib}-G_o}{1+KL}}=1+KL$$

The gain unbalance of the two amplifiers, when each is operating above the AVC point is:

(10)
$$G_1-G_2=\frac{G_{o1}-K_1L_1E_{ci}}{1+K_1L_1}-\frac{G_{o2}-K_2L_2E_{ci}}{1+K_2L_2}$$

$K_1L_1$ is preferably made equal to $K_2L_2$, in which case:

(11)
$$G_1-G_2=\frac{G_{o1}-G_{o2}}{F_c}$$

Equation (11) shows that the gain unbalance above the AVC point is less than the gain unbalance below the AVC point by a factor $1/F_c$ and $F_c$ is preferably made large whereby the gain unbalance above the AVC point is maintained small. Thus, by applying equal control signals to a plurality of amplifier channels and providing automatic gain control from similar circuits individual to the amplifier channels, any initial gain unbalance between the channels is reduced, thereby rendering the gains of the amplifier channels more nearly equal.

The signal output voltages $E_{so1}$ and $E_{so2}$ are respectively applied to signal rectifiers $R_{s1}$ and $R_{s2}$, the combined outputs of which appear across the load resistor $R_L$. The magnitude of the pilot signal $E_{ci}$ produced by the local oscillator O is controlled by an expander-amplifier A, the gain of which is controlled by the gain control voltage $V_a$. The voltage $V_a$ is the combined output of signal rectifiers $R_{s1}$ and $R_{s2}$ appearing across the load resistance $R_L$. Thus, the voltage $E_{ci}$ increases as the average of the signal frequency outputs of the two amplifiers increases, thereby causing an increase in the gain control voltages $V_{c1}$ and $V_{c2}$, which in turn causes a decrease in the gain of each amplifier. It is thus deemed apparent that the total effect of the expander-amplifier and the circuits producing the gain control voltages is to maintain the average of the outputs voltages $E_{so1}$ and $E_{so2}$ approximately constant, and maintain the gains of amplifier channels $G_1$ and $G_2$ approximately equal to thereby preserve the relative amplitudes of the signals $E_{s1}$ and $E_{s2}$ applied thereto.

Referring more specifically to the schematic diagram in FIG. 2, it will be seen that the amplifier channel $G_1$ comprises tubes $V_{1a}$, $V_{2a}$ and $V_{3a}$ in a conventional R-C coupled amplifier circuit, the amplifier channel $G_2$ comprising tubes $V_{1b}$, $V_{2b}$ and $V_{3b}$ in a similar R-C coupled amplifier circuit. The input signals $E_{si1}$ and $E_{si2}$ appearing at terminals $10_a$ and $10_b$ respectively are applied through coupling condensers $C_{5a}$ and $C_{5b}$ to the control grids of tubes $V_{1a}$ and $V_{1b}$, the output of tubes $V_{1a}$ and $V_{1b}$ being applied through coupling condensers $C_{6a}$ and $C_{6b}$ respectively, to the control grids of the second amplifier stage tubes $V_{2a}$ and $V_{2b}$. The outputs of tubes $V_{2a}$ and $V_{2b}$ are applied respectively through coupling condensers $C_{7a}$ and $C_{7b}$ to the control grids of the third amplifier stage comprising tubes $V_{3a}$ and $V_{3b}$; the output of tube $V_{3a}$ being applied to a plate load comprising the primary of band-pass filter $T_{1a}$ and the series connected band-pass filter $T_{2a}$, the output of tube $V_{3b}$ being applied to the primary of band-pass filter $T_{1b}$ and the series connected band-pass filter $T_{2b}$.

Plate supply for the amplifier is provided by positive supply source $B_1$ and is applied, through decoupling resistors $R_{5a}$ and $R_{5b}$ which are respectively by-passed to ground by condensers $C_{8a}$ and $C_{8b}$, to the plate load resistors $R_{6a}$ and $R_{6b}$ of tubes $V_{1a}$ and $V_{1b}$ respectively. Similarly, plate potential is applied from battery $B_1$ through decoupling resistors $R_{7a}$ and $R_{7b}$ which are by-passed to ground by condensers $C_{9a}$ and $C_{9b}$ respectively, to the plate load resistors $R_{8a}$ and $R_{8b}$ of tubes $V_{2a}$ and $V_{2b}$ respectively, plate supply for tubes $V_{3a}$ and $V_{3b}$ being applied to the low potential side of band-pass filters $T_{2a}$ and $T_{2b}$ respectively. As is conventional, grid bias for tubes $V_{2a}$ and $V_{2b}$ is provided by bias circuits respectively comprising resistor $R_{3a}$ and condenser $C_{3a}$, and resistor $R_{3b}$ and condenser $C_{3b}$; grid bias for tubes $V_{3a}$ and $V_{3b}$ being provided by resistor $R_{4a}$ and condenser $C_{4a}$, and resistor $R_{4b}$ and condenser $C_{4b}$.

Screen potential for the pentode amplifier tubes is provided by screen bias supply $B_2$ and, as is conventional, is applied through resistors $R_{9a}$ and $R_{9b}$ which are respectively by-passed to ground by condensers $C_{10a}$ and $C_{10b}$, to the screen grids of the first stage amplifier tubes $V_{1a}$ and $V_{1b}$, screen potential also being applied through resistors $R_{10a}$ and $R_{10b}$ to the screen grids of amplifier tubes $V_{2a}$ and $V_{2b}$ respectively, the screen grids being by-passed to ground by condensers $C_{11a}$ and $C_{11b}$. Screen bias for tubes $V_{3a}$ and $V_{3b}$ is obtained through resistors $R_{11a}$ and $R_{11b}$ respectively, from plate supply source $B_1$, the resistors $R_{11a}$ and $R_{11b}$ being by-passed to ground by condensers $C_{12a}$ and $C_{12b}$ respectively.

The pilot signal $E_{ci}$ is applied through potential divider $P_1$ and resistors $R_{12a}$ and $R_{12b}$ across the cathode biasing circuits comprising resistor $R_{13a}$ and condenser $C_{13a}$ and resistor $R_{13b}$ and condenser $C_{13b}$ of tubes $V_{1a}$ and $V_{1b}$ respectively. The pilot signals are generated in a conventional oscillator circuit including tube $V_4$. The latter circuit includes a tank circuit comprising center-tapped inductor $L_5$ and condensers $C_{14}$ and $C_{15}$, one side of the tank circuit being connected by grid condenser $C_{16}$ to the control grid of $V_4$ and the other side of the tank circuit being coupled by condenser $C_{17}$ to the plate of $V_4$. The center tapped inductor $L_5$ is connected by resistor $R_{14}$ to the cathode of $V_4$ and an amplitude stabilizing grid leak resistor $R_{15}$ is provided. Plate potential is applied from source $B_1$ through resistor $R_{16}$.

The output of the oscillator is taken off the tank circuit and is applied through resistor $R_{12}$ and condenser $C_{18}$ to the cathode of expander-amplifier tube $V_5$, the cathode being maintained at proper potential with respect to ground by potential divider $P_2$ which connects the screen grid of $V_5$ to ground and which is by-passed by condenser $C_{19}$, screen bias potential being applied from supply source $B_2$, as is conventional. The output $V_5$ is applied through condenser $C_{21}$ to the potentiometer $P_1$, whereby the locally generated pilot signal $E_{ci}$ is applied to the amplifier channels $G_1$ and $G_2$.

The band-pass filter $T_{2a}$, which includes inductor $L_{6a}$, and condensers $C_{22a}$ and $C_{23a}$ is tuned to the pilot frequency of 2 kc., and the output thereof is applied through condenser $C_{24a}$ to the cathode of pilot signal rectifier $V_{6a}$. Similarly, the band-bass filter $T_{2b}$ including inductor $L_{6b}$ and condensers $C_{22b}$ and $C_{23b}$ is tuned to the pilot frequency, and the output thereof applied through condenser $C_{24b}$ to the cathode of rectifier tube $V_{6b}$. The tubes $V_{6a}$ and $V_{6b}$ and the associated circuits form conventional AVC rectifiers having detector circuits comprising resistor $R_{18a}$ and condenser $C_{25a}$, and resistor $R_{18b}$ and condenser $C_{25b}$ respectively. The gain control voltages from the AVC filter circuits comprising resistor $R_{19a}$ and condenser $C_{26a}$, and resistor $R_{19b}$ and condenser $C_{26b}$ are respectively applied to grid resistors $R_{22a}$ and $R_{22b}$ of amplifier pentodes $V_{2a}$ and $V_{2b}$, the gain control voltages from the AVC filter circuits comprising resistor $R_{21a}$ and condenser $C_{27a}$, and resistor $R_{21b}$ and condenser $C_{27b}$ being applied to the grid resistors $R_{23a}$ and $R_{23b}$ of the first stage amplifier tubes $V_{1a}$ and $V_{1b}$ respectively. In order to prevent the application of AVC voltages to the amplifier channels until the amplitude of the pilot signal voltages appearing at the outputs of amplifiers $G_1$ and $G_2$ reach a predetermined amplitude, hereinbefore referred to as the AVC point, a positive D.C. bias is applied through potential divider comprising resistors $R_{24}$ and $R_{25}$, through resistors $R_{26a}$ and $R_{26b}$ to the cathodes of tubes $V_{6a}$ and $V_{6b}$ respectively. Thus, the gain of each of the amplifier channels is a value $G_0$ when the amplitude of the pilot signal output is below the AVC point as determined by the delay bias $V_a$ applied to $V_{6a}$ and $V_{6b}$; and when the pilot signal output is above the AVC point, the AVC rectifiers produce an output AVC voltage which is applied to the first and second stages of the amplifier channels to reduce the gain of the amplifier channels and maintain the pilot signal output substantially constant.

As hereinbefore mentioned, the amplitude of the pilot signal input is controlled by the average of the signal frequency output voltages. The band-pass filter $T_{1a}$ having a primary including inductor $L_{7a}$ and condenser $C_{28a}$ and a secondary including inductor $L_{8a}$ and condenser $C_{29a}$, and the band-pass filter $T_{1b}$ having a primary including inductor $L_{7b}$ and condenser $C_{28b}$, and a secondary including inductor $L_{8b}$ and condenser $C_{29b}$, are each tuned to the frequency of the signal output voltages $E_{so1}$ and $E_{so2}$ respectively and the outputs thereof are applied to the rectifiers $V_{7a}$ and $V_{7b}$. The series connected resistors $R_{28a}$ and $R_{29a}$, condenser $C_{30a}$ and resistor $R_{30a}$ form the load impedance of signal rectifier $V_{7a}$, and the series connected resistors $R_{28b}$ and $R_{29b}$, condenser $C_{30b}$ and resistor $R_{30b}$ form the load impedance of rectifier $V_{7b}$, the voltage across the resistors $R_{28a}$, $R_{29a}$, $R_{28b}$ and $R_{29b}$ representing combined output of the two signal rectifiers. A bias voltage $V_a$ is obtained from the rectifier load resistors by potentiometer $P_3$ which is connected in shunt with the load resistors $R_{29a}$ and $R_{29b}$, which voltage is applied across condenser $C_{31}$ and to the control grid of expander amplifier tube $V_5$. This potentiometer affords adjustment of the relative effects of the two channels in actuating the expander tube $V_5$ and is normally set so that the two channels produce exactly equal effects. Thus, the amplification of the expander-amplifier is controlled by the average of the signal frequency outputs of the two amplifier channels whereby the pilot signal voltage $E_{ci}$ applied to each of the amplifier channels increases as the average of the output signal voltages increases. However, an increase in the pilot $E_{ci}$ produces an increase in the gain control voltages $V_{c1}$ and $V_{c2}$ produced by the pilot signal rectifiers, and the gain of each of the amplifier channels is decreased accordingly.

The signal outputs from amplifier channels $G_1$ and $G_2$ appearing at terminals 11$_a$ and 11$_b$, are respectively correlative with the signals $E_{si1}$ and $E_{si2}$ applied to the input of the amplifier channels and are applied to suitable signal responsive circuits.

From the foregoing it is deemed apparent that the pilot signal rectifiers $R_{c1}$ and $R_{c2}$ which apply delayed AVC to the respective amplifier channels $G_1$ and $G_2$, thereby maintain the pilot signal voltages $E_{co1}$ and $E_{co2}$ at a substantially constant value determined by the delay bias $V_a$ applied thereto. Further, the components of the amplifier channels and AVC circuits are chosen such as to obtain substantially equal gain response to the AVC voltages in the several amplifier channels and also effectuate equal response in the several AVC circuits. Thus, changes in the gains in the several amplifier channels produced by changes in the pilot signal voltage will be substantially equal. Additionally any initial gain unbalance between the several amplifier channels will be reduced by a factor $F_c$ as is apparent from Equation [11] supra. The relative gains of the several amplifier channels are thus maintained substantially equal above the AVC point, and the relative amplitudes of the applied signals $E_{so1}$ and $E_{so2}$ retained. The gains of the amplifiers can be made exactly equal by adjustment of the control signals by potentiometer $P_1$ to suitable unequal values. Alternatively, the gains can be made unequal by any desired small amount by adjustment of potentiometer $P_1$. The equality or inequality of gains, once established with a given signal level at 10$_a$ and 10$_b$, is closely maintained as the signal level varies.

Obviously, many modifications and variations of the present invention are possible in the light of the above teachings. It is therefore to be understood that within the scope of the appended claims, the invention may be practiced otherwise than as specifically described.

What is claimed as new and desired to be secured by Letters Patent of the United States is:

1. An amplifier comprising a plurality of amplifier channels each adapted to amplify a discrete A.-C. signal, common means for applying an A.-C. pilot voltage to each of said amplifier channels, gain control means individual to said channels and responsive to the pilot output of each of said amplifier channels, an output circuit common to said plurality of channels for receiving solely the amplified A.-C. signals therefrom, and means responsive to the A.-C. signals appearing in said output circuit for controlling the amplitude of the pilot signal voltage applied to said channels.

2. An amplifier for a plurality of A.-C. signals comprising a plurality of amplifier channels each adapted to amplify one of said A.-C. signals, common means for applying an A.-C. pilot voltage to each of said amplifier channels, gain control means individual to said channels and responsive to the pilot output voltages of each of said amplifier channels, and means responsive solely to the combined A.-C. signal outputs of all of said amplifier channels for controlling the amplitude of the pilot signal voltage applied to said channels.

3. The combination of claim 2 wherein said last mentioned means includes an oscillator and an expander-amplifier.

4. An amplifier for a plurality of A.-C. signals comprising a plurality of amplifier channels each adapted to amplify one of said signals, common means for applying an A.-C. pilot voltage to each of said amplifier means, delayed gain control means individual to each of said amplifier channels and responsive to the pilot output voltages thereof for maintaining the pilot output voltages of all of the channels substantially equal and constant at a predetermined level, and means responsive solely to the combined A.-C. signal outputs of all of said amplifiers for controlling the amplitude of the pilot input signal to thereby control the gains of the amplifier channels.

5. The method of controlling the gains of a plurality of amplifier channels for amplifying discrete signals comprising the steps of introducing controllable pilot voltages having the same amplitude at any instant into each of the channels, controlling the gains of each of the channels variably in accordance with the magnitude of the pilot voltages appearing at the output of the respective channels, deriving a control signal correlative solely to the combined effects of the amplified signals, and utilizing the control signal to variably control the amplitude of the pilot voltages.

References Cited in the file of this patent

UNITED STATES PATENTS

| | | |
|---|---|---|
| 2,231,558 | Bollman | Feb. 11, 1941 |
| 2,350,951 | Zinn | June 6, 1944 |
| 2,539,426 | Jacobsen et al. | Jan. 30, 1951 |